United States Patent
Hindle et al.

(10) Patent No.: US 8,002,251 B2
(45) Date of Patent: Aug. 23, 2011

(54) VIBRATION REDUCTION SYSTEM EMPLOYING ACTIVE BEARING MOUNTS

(75) Inventors: Timothy A. Hindle, Peoria, AZ (US); Toren S. Davis, Peoria, AZ (US); Brian J. Hamilton, Glendale, AZ (US); Robert E. Winkel, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 682 days.

(21) Appl. No.: 11/940,032

(22) Filed: Nov. 14, 2007

(65) Prior Publication Data

US 2009/0121399 A1    May 14, 2009

(51) Int. Cl.
*F16F 15/00* (2006.01)
*G01C 19/04* (2006.01)

(52) U.S. Cl. .............. 267/140.15; 267/140.11; 74/5.5; 74/5 F

(58) Field of Classification Search .......... 267/136, 267/140.11, 140.15, 140.5; 384/517, 518, 384/519, 563, 583, 616, 103, 105, 106, 107, 384/119, 263; 74/5.5, 5 F
See application file for complete search history.

(56) References Cited

U.S. PATENT DOCUMENTS

| 5,221,146 A * | 6/1993 | Maruyama ............ 384/519 |
| 5,397,183 A | 3/1995 | Lu et al. |
| 5,564,840 A * | 10/1996 | Jurras et al. ............ 384/517 |
| 5,772,334 A * | 6/1998 | Parkins et al. ............ 384/117 |
| 6,283,636 B1 | 9/2001 | Schnur et al. |
| 6,582,125 B1 * | 6/2003 | Lee et al. ............ 384/106 |
| 6,920,794 B2 * | 7/2005 | Luo et al. ............ 73/660 |
| 2002/0139603 A1 | 10/2002 | Aiken et al. |

FOREIGN PATENT DOCUMENTS

DE  102004024851 A1  12/2005
EP       1134443 A2   9/2001

OTHER PUBLICATIONS

European Search Report for Application No. EP 08 16 8976, dated Feb. 20, 2009.
EP Communication for EP 08168976.2-2424 dated Jun. 25, 2009.
EP Communication for EP 08168976.2-2424 dated Mar. 2, 2011.

* cited by examiner

*Primary Examiner* — Thomas J Williams

(57) ABSTRACT

A vibration reduction system is provided for use in conjunction with a rotational device including a stationary body, a rotating body, and a first bearing assembly disposed between the stationary body and the rotating body. The vibration reduction system includes a first plurality of bearing mount actuators residing between the stationary body and the first bearing assembly. The first plurality of bearing mount actuators is configured to adjust the radial position of the first bearing assembly. The vibration reduction system further includes a vibration sensor, which is coupled to the stationary body, and a controller, which is coupled to the vibration sensor and to the first plurality of bearing mount actuators. The controller is configured to reduce vibrations sensed by the vibration sensor by selectively adjusting the radial position of the first bearing assembly utilizing the first plurality of bearing mount actuators.

11 Claims, 3 Drawing Sheets

VIBRATION REDUCTION SYSTEM EMPLOYING ACTIVE BEARING MOUNTS

TECHNICAL FIELD

The present invention relates generally to a vibration reduction system and, more particularly, to a vibration reduction system that employs a plurality of active bearing mounts and that is well-suited for use in conjunction with a rotating device, such as a control moment gyroscope.

BACKGROUND

Rotational devices, such as control moment gyroscopes, are commonly employed in satellite attitude control systems. Such rotational devices generally comprise a stationary body (i.e., a housing) and a rotational body (i.e., a rotor). The rotor may include an inertial element (e.g., outer rim) that is coupled to a rotational shaft by way of a suspension web. The shaft's upper and lower ends are each received by an annulus provided within the housing. As rotational motion is imparted to the inertial element, each shaft end rotates within its annulus. First and second bearing assemblies may be disposed within each annulus and around a shaft end. Each bearing assembly may comprise, for example, a bearing cartridge and an outer sleeve, which exerts a predetermined clamping force on the bearing cartridge. The bearing cartridge may include an inner ring, an outer ring, and a plurality of rolling elements (e.g., ball bearings) captured between the inner ring and the outer ring. As the rotor turns, the inner ring rotates along with the rotor's shaft and the ball bearings travel within the raceway thus minimizing frictional forces.

The rotor of the rotational device described above may be imbalanced, resulting in vibrations that may be imparted to, and negatively impact the performance of, the host satellite. The vibrations may be induced from static imbalance, which may occur as a result of the principal inertia axis of the rotor being offset from and parallel to the axis of rotation, and/or dynamic imbalance, which may occur as a result of the principal inertia axis of the rotor intersecting the rotation axis of the rotor at the center of mass, where the principal inertia axis and the rotation axis are not parallel. Although compliant mounts have been developed to attenuate (e.g., isolate) vibrations produced by such imbalances, compliant mounts may decrease the effectiveness of the rotational device. Moreover, compliant mounts may be relatively bulky and thus undesirably cumbersome for deployment onboard a satellite.

Considering the foregoing, it is desirable to provide a vibration reduction system that occupies a relatively small volume with relatively small mass suitable for use in conjunction with a rotating device, such as a control moment gyroscope. Preferably, such a vibration reduction system would be capable of significantly reducing vibrations resulting from both rotor imbalances and other imperfections, such as bearing geometry imperfections. It would also be desirable to provide an active bearing mount for use in conjunction with such a vibration reduction system. Other desirable features and characteristics of the present invention will become apparent from the subsequent detailed description of the invention and the appended claims, taken in conjunction with the accompanying drawings and this background of the invention.

BRIEF SUMMARY

A vibration reduction system is provided for use in conjunction with a rotational device including a stationary body, a rotating body, and a first bearing assembly disposed between the stationary body and the rotating body. The vibration reduction system includes a first plurality of bearing mount actuators residing between the stationary body and the first bearing assembly. The first plurality of bearing mount actuators is configured to adjust the radial position of the first bearing assembly. The vibration reduction system further includes a vibration sensor, which is coupled to the stationary body, and a controller, which is coupled to the vibration sensor and to the first plurality of bearing mount actuators. The controller is configured to reduce vibrations sensed by the vibration sensor by selectively adjusting the radial position of the first bearing assembly utilizing the first plurality of bearing mount actuators.

An active bearing mount is further provided that is suitable for use in conjunction with a vibration reduction system deployed in a rotational device of the type that includes a housing and a bearing assembly. The vibration reduction system includes a controller, and the active bearing mount includes a first piezoelectric actuator coupled to the controller and disposed between the housing and the bearing assembly. A flexure is positioned proximate the first piezoelectric actuator, and the first piezoelectric actuator is configured to change thickness in response to an applied voltage from the controller so as to adjust the radial position of the bearing assembly and thus minimize vibrations transmitted therethrough.

BRIEF DESCRIPTION OF THE DRAWINGS

The present invention will hereinafter be described in conjunction with the following drawing figures, wherein like numerals denote like elements, and.

DETAILED DESCRIPTION OF AT LEAST ONE EXEMPLARY EMBODIMENT

The following detailed description of the invention is merely exemplary in nature and is not intended to limit the invention or the application and uses of the invention. Furthermore, there is no intention to be bound by any theory presented in the preceding background of the invention or the following detailed description.

Figure 1:
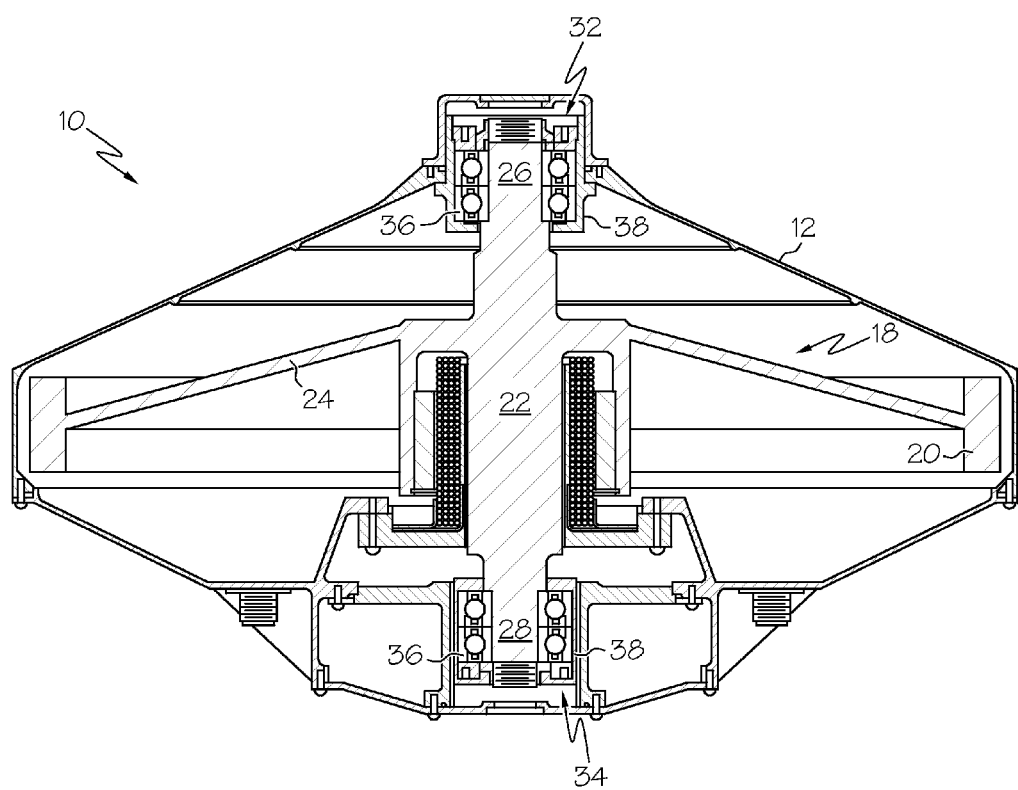
FIG. 1 is a cross-sectional view of a conventional control moment gyroscope (CMG) inner gimbal assembly.

FIG. 1 is a cross-sectional view of the inner gimbal assembly (IGA) 10 of a conventional rotational device, a control moment gyroscope (CMG), suitable for deployment on a satellite or other such spacecraft. CMG inner gimbal assembly 10 includes a stationary body (i.e., a housing) 12 in which a rotational body (i.e., a rotor) 18 is mounted for rotational movement. Rotor 18 includes an inertial element 20 (e.g., outer rim) that is coupled to a central rotatable shaft 22 via a suspension web 24. Shaft 22 includes first and second opposing ends 26 and 28, which are each received in a different annulus provided in housing 12. A bearing assembly is disposed within each annulus to facilitate the rotational movement of shaft 22; e.g., a first bearing assembly 32 may be mounted around shaft end 26, and a second bearing assembly 34 may be mounted around shaft end 28. Bearing assemblies 32 and 34 may each include an annular bearing cartridge 36 housed within a cylindrical outer sleeve 38. As shown in FIG. 1, bearing cartridges 36 may be conventional duplex bearings each having an inner ring, an outer ring, and two adjacent rows of ball bearings captured between the inner and outer rings; however, any suitable type of bearing assembly may be employed.

Figure 2:
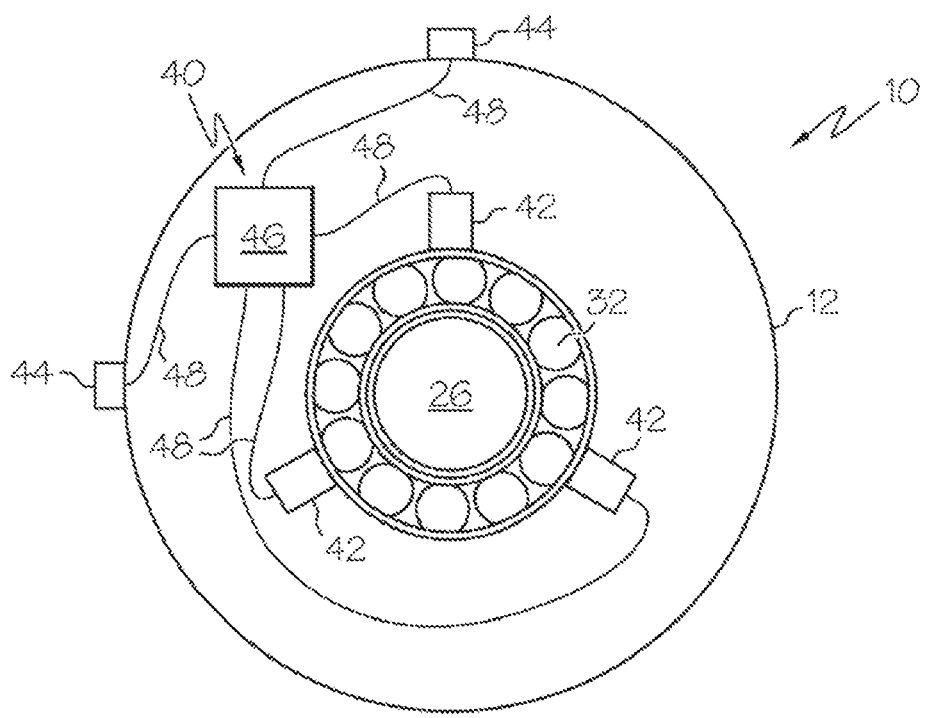
FIG. 2 is a simplified top cross-sectional view of a CMG inner gimbal assembly equipped with an exemplary embodiment of the vibration reduction system.

As noted previously, rotor 18 of CMG inner gimbal assembly 10 may be imbalanced and consequently produce vibrations during operation. FIG. 2 is a simplified top cross-sectional view of an exemplary vibration reduction system 40 that may be incorporated into CMG inner gimbal assembly 10 (or other such rotational device) to significantly reduce or eliminate vibrations induced by such imbalances. Vibration reduction system 40 comprises three general types of components: (1) a plurality of active bearing mounts 42, (2) one or more vibration sensors 44, and (3) a central controller 46. As shown in FIG. 2, controller 46 is operatively coupled to bearing mounts 42 and to vibration sensors 44 (e.g., by means of connections 48). As will be described below, vibration sensors 44 send signals to controller 46 indicative of radial and/or axial vibrations emitted from shaft 22. Although these signals may be electrically transmitted via connections 48, in alternative embodiments, sensors 44 may send signals to controller 46 utilizing a wireless means, such as a radiofrequency transmitter.

Vibration sensors 44 may comprise any device and may be disposed at any location suitable for measuring a characteristic indicative of vibratory motion imparted to housing 12 or another component of CMG inner gimbal assembly 10 by rotor 18 (FIG. 1). For example, as indicated in FIG. 2, sensors 44 may each comprise an accelerometer mounted on an external surface of housing 12. Although a single sensor 44 may be utilized (e.g., a dual-axis accelerometer), it is preferable that multiple sensors 44 are employed (e.g., multiple accelerometers measuring acceleration along different perpendicular axes). If vibration reduction system 40 is configured to reduce only vibrations resulting from rotor imbalances, sensors 44 may collectively measure vibrations transmitted radially from shaft 22. However, if vibration reduction system 40 is configured to additionally reduce vibrations resulting from other sources of imperfection, such as bearing geometric imperfections, sensors 44 are preferably configured to collectively measure vibrations transmitted both radially and axially from shaft 22.

Active bearing mounts 42 are disposed around and support bearing assembly 32. In particular, active bearing mounts 42 are disposed between a component of bearing assembly 32 (e.g., the bearing assembly's outer sleeve) and an internal structure of housing 12 (shown in FIG. 3 and described below). To provide a stable multi-point mount, active bearing mounts 42 are preferably substantially evenly spaced around the circumference of shaft 22. For example, as shown in FIG. 2, three active bearing mounts 42 may be preferably spaced around the circumference of shaft 22 at approximately 120 degree intervals. Of course, if a different number of active bearing mounts are employed, the angular spacing may vary accordingly; e.g., if four active bearing mounts are employed, the bearing mounts may be spaced apart at 90 degree intervals.

Figure 3:
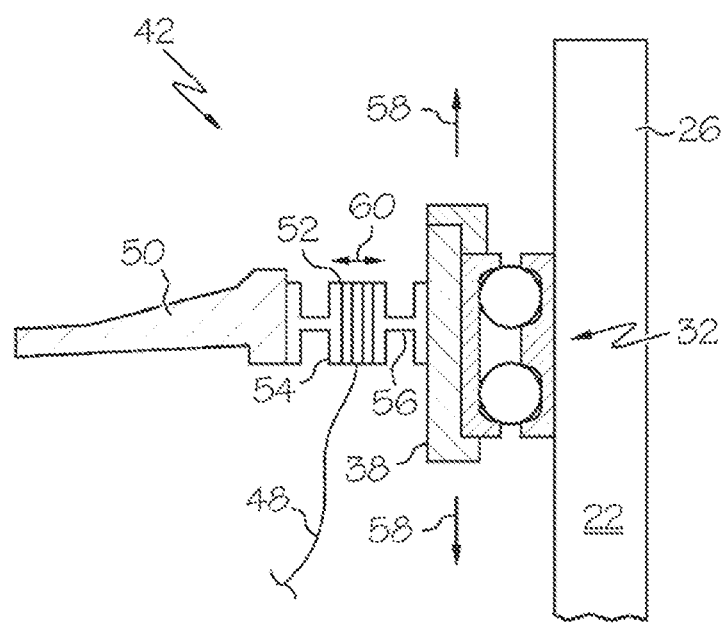
FIG. 3 is a cross-sectional view of a first exemplary active bearing mount suitable for use in conjunction with the vibration reduction system shown in FIG. 2 and configured to perform radial adjustments of the bearing assembly.

FIG. 3 is a cross-sectional view of exemplary active bearing mount 42. As can be seen in FIG. 3, active bearing mount 42 is disposed between an internal structure 50 (e.g., a bearing support diaphragm) of housing 12 (FIG. 2) and outer sleeve 38 of bearing assembly 32. Active bearing mount 42 includes at least one bearing mount actuator 52. To provide a suitably rigid mounting for bearing assembly 32, bearing mount actuator 52 preferably takes the form of a stiff actuator of the type which alters thickness upon the application of a voltage or other such stimuli (indicated in FIG. 3 by arrow 60). In particular, bearing mount actuator 42 preferably comprises a piezoelectric actuator, such as a plurality of piezoelectric sheets adhesively joined together to form a solid body a fraction of an inch thick, and will subsequently be referred to as such herein. This example notwithstanding, it should be understood that bearing mount actuator 52 may comprise any body or device that may be utilized to selectively adjust the radial position of bearing assembly 32, including, for example, a hydraulic cell that expands and contracts in relation to the pressure of a supplied fluid.

When shaft 22 moves axially relative to internal structure 50 of housing 12, shear forces may be transferred to active bearing mount 42 (indicated in FIG. 3 by arrows 58). Such shear forces could potentially damage piezoelectric actuator 52. Thus, to minimize the transmission of shear forces to piezoelectric actuator 52, active bearing mount 42 may be provided with one or more flexures (e.g., T- or H-shaped metallic bodies) coupled in series with piezoelectric actuator 52. For example, as shown in FIG. 3, a first flexure 54 may be disposed between internal structure 50 and bearing mount actuator 52, and second flexure 56 may be disposed between actuator 52 and outer sleeve 38 of bearing assembly 32. Flexures 54 and 56 may also serve to maintain piezoelectric actuator 52 under a predetermined compressive pre-load.

When rotor 18 of CMG inner gimbal assembly 10 is imbalanced, induced vibrations are transmitted from shaft 22, through bearing assembly 32 and active bearing mounts 52, and to housing 12. To reduce vibrations resulting from imbalance forces, vibration reduction system 40 is configured to diminish or eliminate any radial disturbance transmission paths through active bearing mounts 42. In particular, controller 46 is configured to receive signals from sensors 44 indicative of vibratory force imparted to housing 12 or other components of CMG inner gimbal assembly 10 (e.g., each sensor 44 may provide controller 46 with a signal indicative of acceleration along a given axis within a radial plane). From these signals, controller 46 determines the magnitude and direction of the radial disturbance transmission path(s) from shaft 22 through bearing assembly 32. Controller 46 then adjusts the radial position of bearing assembly 32 utilizing active bearing mounts 42 to reduce or eliminate the disturbance transmission paths (e.g., controller 46 may adjust the radial position of bearing assembly 32 to drive each sensor signal to null). Controller 46 adjusts the radial position of bearing assembly 32 by applying a determined voltage to one or more of the piezoelectric actuators 52, which change thicknesses accordingly. As an example, controller 46 may decrease the thickness of a piezoelectric actuator employed in an active bearing mount through which a disturbance path has developed. At the same, controller 46 may increase the thicknesses of the opposing piezoelectric actuator(s) to maintain adequate support of bearing assembly 32.

It will be appreciated that the bandwidth of controller 46 may be limited in practice by resonant modes of the surrounding structure. An exemplary method of performing control function takes advantage of the periodic nature of rotational disturbances to reduce the bandwidth required of the controller. By assuming that the disturbance will be a rotating vector synchronous with the speed of the wheel, the controller need only determine the appropriate amplitude and phase of the correction. These quantities vary much more slowly than the corrections themselves.

Vibration reduction system 40 has thus been described as reducing vibrations induced from a rotor imbalance within CMG inner gimbal assembly 10. When vibration reduction system 40 is configured to reduce only rotor imbalance vibrations, only radial transmission paths at the bearing locations are controlled. However, in many applications, it may be desirable for vibration reduction system 40 to reduce not only vibrations resulting from rotor imbalance, but also those resulting from other disturbance sources, such as disturbances associated with ball-bearing geometric imperfections. In this case, vibration reduction system 40 may comprise at least one additional vibration sensor that may measure a characteristic (e.g., acceleration) indicative of axial motion. In addition, vibration reduction system 40 may also employ an active bearing mount that is capable of adjusting both the radial position and the axial position of the bearing assembly. An example of such an active bearing mount is described below in conjunction with FIG. 4.

Figure 4:
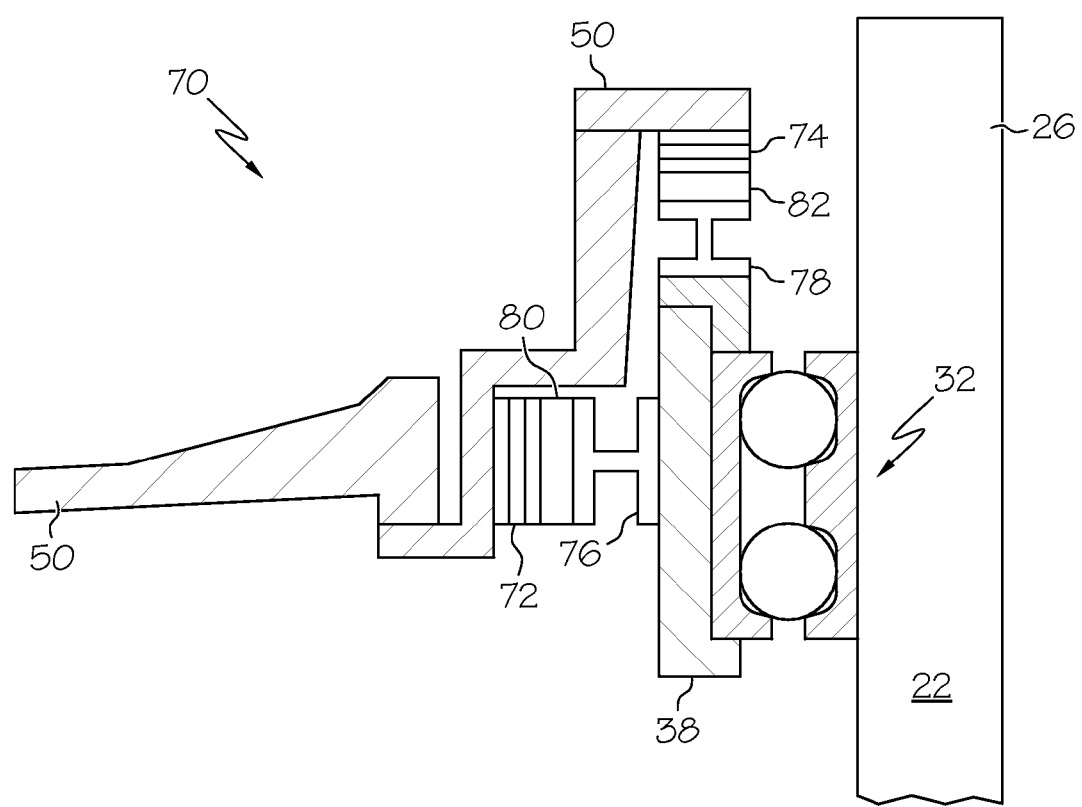
FIG. 4 is a cross-sectional view of a second exemplary active bearing mount suitable for use in conjunction with the vibration reduction system shown in FIG. 2 and configured to perform radial and axial adjustments of the bearing assembly.

FIG. 4 is a cross-sectional view of a second exemplary active bearing mount 70 that may be utilized by vibration reduction system 40 (FIG. 2) in place of each active bearing mount 42 (FIGS. 2 and 3) to perform both radial and axial adjustments to bearing assembly 32. As was the case with active bearing mount 42 (FIG. 3), active bearing mount 70 may be disposed between an internal structure 50 (e.g., a bearing support diaphragm) of housing 12 (FIG. 2) and outer sleeve 38 of bearing assembly 32. However, unlike active bearing mount 42, active bearing mount 70 may include first and second actuators 72 and 74, each of which may be a piezoelectric actuator of the type described above. Piezoelectric actuators 72 and 74 are positioned so as to adjust the radial and axial positions of bearing assembly 32, respectively. That is, piezoelectric actuator 72 is positioned so as to change thicknesses along an axis that is substantially perpendicular to the longitudinal axis of shaft 22, and piezoelectric actuator 74 is positioned so as to change thickness along an axis that is substantially parallel to the longitudinal axis of shaft 22. To protect piezoelectric actuators 72 and 74 from shear forces, first and second flexures 76 and 78 may be disposed between outer sleeve 38 of bearing assembly 32 and actuators 72 and 74, respectively, as shown in FIG. 4.

To eliminate the need for external vibration sensors (e.g., sensors 44 described above in conjunction with FIG. 2), or to supplement such sensors, the active bearing mount may include one or more load cell sensors. For example, as shown in FIG. 4, active bearing mount 70 may include first and second load cell sensors 80 and 82, which may be coupled in series with piezoelectric actuator 72 and 74, respectively. Load cell sensors 80 and 82 may each comprise any device or element suitable for measuring forces conducted through active bearing mount 70 to internal structure 50. This notwithstanding, load cell sensors 80 and 82 each preferably comprise a piezoelectric transducer (i.e., a piezoelectric device that generates a voltage in relation to mechanical stress) and will thus be referred to as such herein. Piezoelectric transducers 80 and 82 are each coupled to controller 46 (FIG. 3) via an electrical connection (not shown for clarity). During operation of vibration reduction system 40, controller 46 monitors the voltages produced by piezoelectric transducers 80 and 82 to determine the magnitude and direction of vibratory forces conducted through each active bearing mount 70.

As stated previously, vibration reducing system 40 may significantly reduce or eliminate vibrations induced from both rotor imbalances and other imperfections (e.g., bearing geometric imperfections) by adjusting the radial and axial position of bearing assembly 32 utilizing active bearing mounts 70. To accomplish this, controller 46 first measures vibratory motion imparted to housing 12 (or other component of CMG 10) through active bearing mounts 70 utilizing piezoelectric transducers 80 and 82 and/or vibration sensors 44 (FIG. 3). In particular, controller 46 may estimate the amplitude and phase of one or more sinusoids synchronous with the wheel speed. Controller 46 determines from these signals the direction and magnitude of any force vectors conducted through active bearing mounts 70. Controller 46 then adjusts the radial position and/or the axial position of bearing assembly 32 utilizing piezoelectric actuators 72 and 74, respectively, so as to reduce or eliminate the disturbance transmission paths through bearing assembly 32 in the manner described above.

Considering the foregoing, it should be appreciated that there has been provided a vibration reduction system occupying a relatively small volume with relatively small mass, suitable for use in conjunction with a rotating device, such as a control moment gyroscope. In at least one embodiment, the vibration reduction system is capable of significantly reducing vibrations resulting from both rotor imbalances and other imperfections (e.g., bearing geometric imperfections). In addition, there has been provided an active bearing mount for use in conjunction with such a vibration reduction system. Lastly, it should be noted that, although described-above in conjunction with a particular type of rotational device (i.e., a control moment gyroscope), the vibration reduction system may be utilized in conjunction with any suitable type of rotational device.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A vibration reduction system for use in conjunction with a rotational device that includes a stationary body, a rotating body, and a first bearing assembly disposed between the stationary body and the rotating body, the vibration reduction system comprising:

a first plurality of piezoelectric actuators residing between the stationary body and the first bearing assembly and configured to adjust the radial position of the first bearing assembly;

a plurality of flexures positioned between the first plurality of piezoelectric actuators and the rotating body and deflecting in an axial direction in response to axial movement of the rotating body during operation of the rotational device to reduce shear forces transmitted to the first plurality of piezoelectric actuators, each of the plurality of flexures maintaining a different one of the first plurality of piezoelectric actuators under a predetermined compressive preload;

a vibration sensor coupled to the stationary body; and a controller coupled to the vibration sensor and to the first plurality of piezoelectric actuators, the controller configured to reduce vibrations sensed by the vibration sensor by selectively adjusting the radial position of the first bearing assembly utilizing the first plurality of piezoelectric actuators.

2. A vibration reduction system according to claim 1 wherein the first plurality of piezoelectric actuators is substantially evenly spaced around the circumference of the first bearing assembly.

3. A vibration reduction system according to claim 1 wherein the vibration sensor comprises a load cell sensor.

4. A vibration reduction system according to claim 3 wherein the load cell sensor is coupled in series with an actuator in the first plurality of piezoelectric actuators.

5. A vibration reduction system according to claim 4 wherein the load cell sensor comprises a piezoelectric transducer.

6. A vibration reduction system according to claim 1 further comprising a second plurality of bearing mount actuators residing between the stationary body and the first bearing assembly and configured to adjust the axial position thereof.

7. A vibration reduction system according to claim 6 wherein each actuator in the second plurality of bearing mount actuators comprises a piezoelectric actuator.

8. A vibration reduction system according to claim 1 wherein the rotational device further includes a second bearing assembly disposed between the stationary body and the rotating body, and wherein the vibration reduction system further comprises a second plurality of bearing mount actuators residing between the stationary body and the second bearing assembly and configured to adjust the radial position thereof.

9. An inner gimbal assembly for deployment within a control moment gyroscope, the inner gimbal assembly comprising:
   an inner gimbal assembly (IGA) housing including a bearing support diaphragm;
   a rotor rotatably mounted within the IGA housing;
   a bearing assembly positioned between the bearing support diaphragm and the rotor; and
   a vibration reduction system, comprising:
      a plurality of piezoelectric actuators disposed between the bearing support diaphragm and an end portion of the rotor;
      a vibration sensor positioned proximate the rotor and configured to measure vibratory motion imparted to the IGA housing;
      a plurality of flexures positioned between the plurality of piezoelectric actuators and the bearing assembly, the plurality of flexures deflecting in an axial direction in response to axial movement of the rotor during operation of the control moment gyroscope to reduce the transmission of shear forces to the plurality of piezoelectric actuators; and
      a controller coupled to the vibration sensor and to the plurality of piezoelectric actuators, the controller configured to: (i) estimate the amplitude and phase of at least one sinusoid detected by the vibration sensor synchronous with the speed of the rotor and transmitted through a first piezoelectric actuator included within the plurality of piezoelectric actuators, and (ii) reduce the estimated amplitude by decreasing the thickness of the first piezoelectric actuator while simultaneously increasing the thickness of at least a second piezoelectric actuator included within the plurality of piezoelectric actuators.

10. An inner gimbal assembly according to claim 9 wherein the plurality of flexures comprises a first flexure coupled between the rotor and the first piezoelectric actuator and maintaining the first piezoelectric actuator under a compressive preload.

11. An inner gimbal assembly according to claim 10 wherein the plurality of flexures further comprises a second flexure coupled between the first piezoelectric actuator and the bearing support diaphragm substantially opposite the first flexure.

* * * * *